United States Patent

Harkness

[11] 4,037,389
[45] July 26, 1977

[54] BRAKE SAFETY SYSTEM FOR A POWER DRIVEN ROTARY MOWER

[75] Inventor: Joseph R. Harkness, Germantown, Wis.

[73] Assignee: Briggs & Stratton Corporation, Wauwatosa, Wis.

[21] Appl. No.: 667,696

[22] Filed: Mar. 17, 1976

Related U.S. Application Data

[63] Continuation-in-part of Ser. No. 485,946, July 5, 1974, abandoned.

[51] Int. Cl.² .......................................... A01D 69/10
[52] U.S. Cl. ................................................. 56/11.3
[58] Field of Search ..................... 56/10.5, 11.3, 11.7, 56/DIG. 4, DIG. 6; 188/82.7, 71.7, 68, 166

[56] References Cited

U.S. PATENT DOCUMENTS

| 2,001,810 | 5/1935 | Zwald | 188/82.7 |
| 2,985,992 | 5/1961 | Dowdle | 56/11.3 |
| 3,115,218 | 12/1963 | Waldrop | 188/82.7 |
| 3,253,391 | 5/1966 | Meldahl | 56/11.3 |
| 3,838,755 | 10/1974 | Cochran et al. | 188/71.7 |
| 3,871,159 | 3/1975 | Shriver | 56/11.3 |

Primary Examiner—Jay N. Eskovitz
Assistant Examiner—James D. Hamilton
Attorney, Agent, or Firm—Ira Milton Jones & Associates

[57] ABSTRACT

A brake mechanism for quickly stopping the drive shaft of an internal combustion engine on a power driven rotary mower.

15 Claims, 8 Drawing Figures

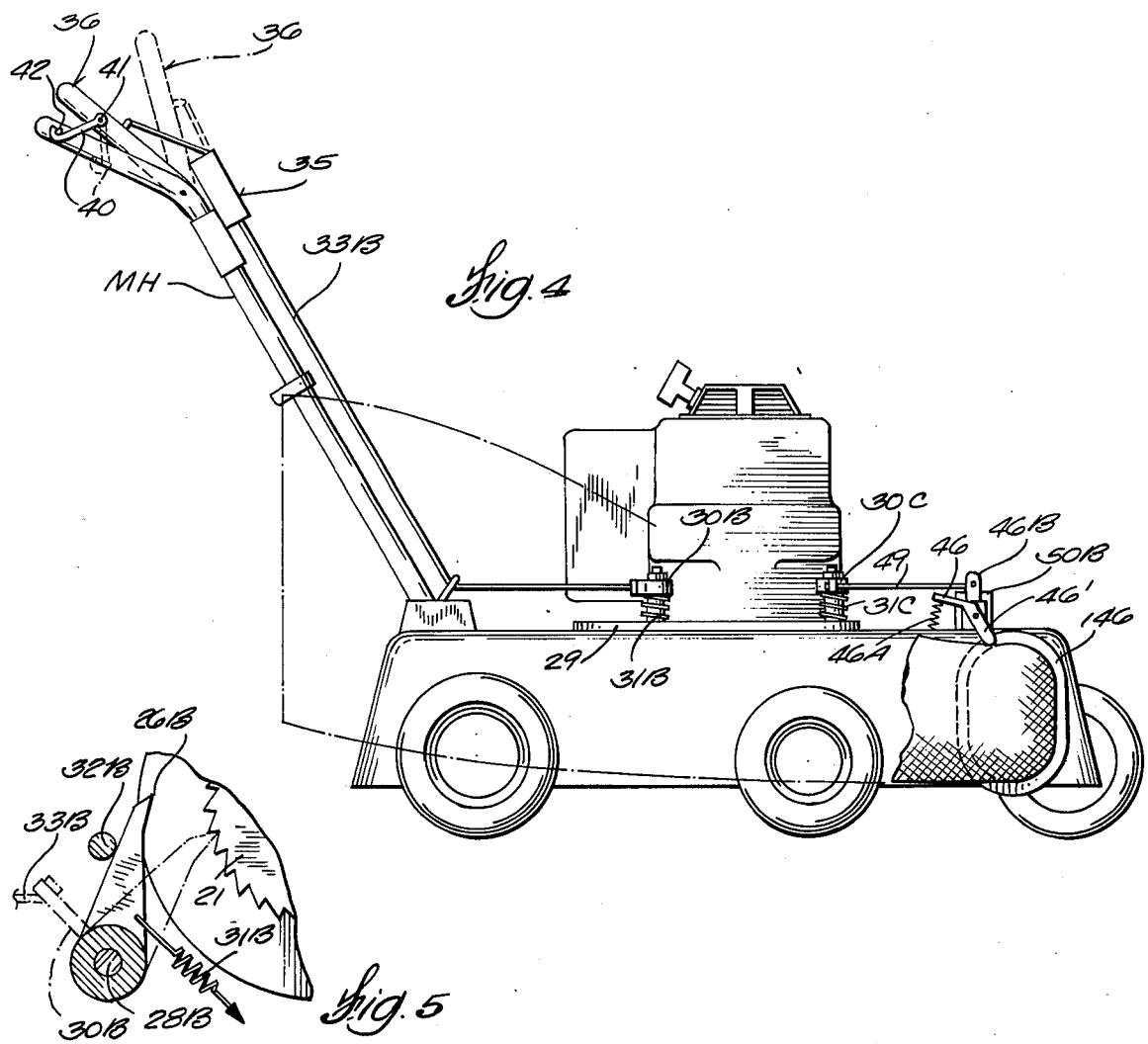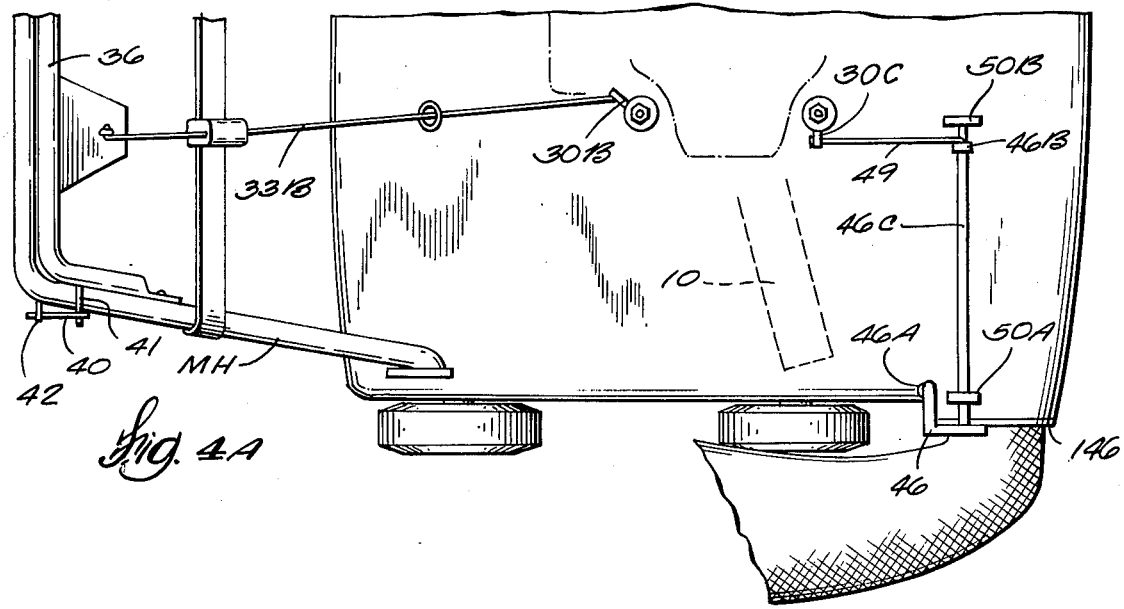

BRAKE SAFETY SYSTEM FOR A POWER DRIVEN ROTARY MOWER

This invention, like that of the copending application Ser. No. 485,946 filed July 5, 1974, now abandoned, of which this is a continuation-in-part, has as its purpose to provide a brake capable of quickly stopping an internal combustion engine or other prime mover, used to power lawn mowers — and, more particularly, mowers of the walk-behind rotary type.

While the invention herein described reduces or eliminates certain hazardous conditions in rotary lawn mowers, attention is directed to the fact that it may in itself present safety hazards if it is not properly designed and engineered in its specific embodiments. It is imperative, therefore, that the highest degree of skill and care be exercised in the practical application of the invention, and that every prototype embodying the invention be fully and conscientiously tested before commercial models are released to the public.

One of the objectionable characteristics and hazards of rotary mowers results from the fact that their blades continue to rotate for a time after the application of driving torque thereto is terminated. Thus, for example, where the prime mover is a single cylinder internal combustion engine and the blade is fixed directly to the crankshaft of the engine, friction and compression pumping losses can be and have been relied upon to stop the blade after the engine ignition is shut off. But there may be a time lag of 4 or 5 seconds between shutting off the ignition and final stopping of the engine, and of the blade fixed to its crankshaft. While that is not a very long time, a reliable brake mechanism by which that time lag could be materially reduced, would be an improvement, especially if its cost were reasonable.

With a view to achieving that objective, this invention has as its principle object the provision of a simple reliable brake mechanism that can be made a part of the engine and by which rotation of an engine crankshaft and a rotary mower blade secured thereto is, for all intents and purposes, stopped instantaneously and automatically upon activation of the brake mechanism.

Another object of this invention is to provide a brake mechanism that can be activated in a number of different ways, either automatically as a consequence of the performance of a function of the machine for which the brake-equipped engine provides power — as, for instance, the removal of the grass catching bag on a rotary lawn mower, or intentionally by a key controlled device with a view to preventing unauthorized use of the machine.

More specifically, it is the purpose and object of this invention to equip the engine of a power driven rotary lawn mover with a reliable brake mechanism by which rotation of its drive shaft can be stopped practically instantaneously, which brake mechanism is of the disc type and comprises a pair of frictionally engaged discs, one of which is secured to the drive shaft of the engine and the other of which is free to rotate about the drive shaft, a ratchet wheel affixed to or with respect to the free disc, and associated pawl means mounted on a part fixed with respect to the engine, and operable to engage the ratchet wheel to abruptly stop rotation of the free disc and, through its frictional engagement with the other disc, effect frictional braking of the rotating drive shaft and the cutting blade fixed thereto.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of the physical embodiments of the invention constructed according to the best modes so far devised for the practical application of the principles thereof, and in which:

FIG. 4 is an enlarged fragmentary view in side elevation illustrating the manner in which a deadman or safety control can be employed to activate the brake mechanism and effect quick stopping of the engine and the blade fixed thereto;

FIG. 4A is a fragmentary plan view of the deadman control shown in FIG. 4; and

FIG. 5 is an enlarged fragmentary view in section illustrating a detail of the brake mechanism.

Figure 1:
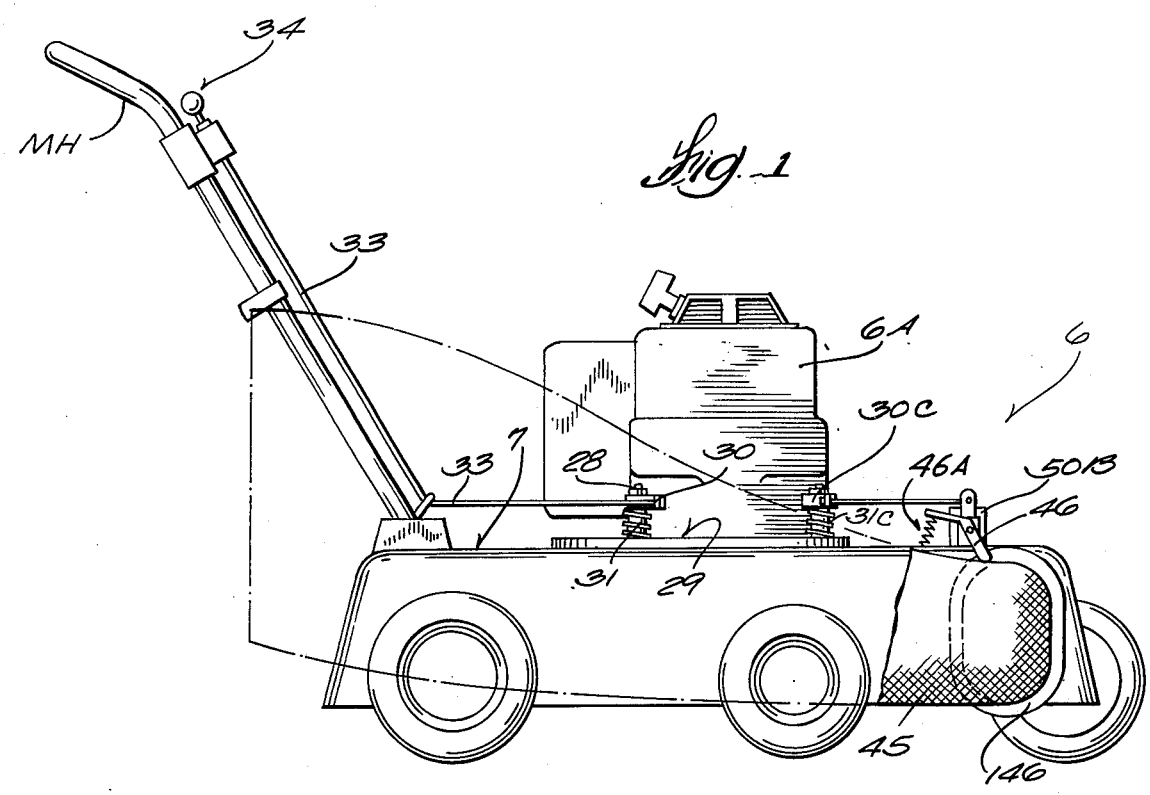
FIG. 1 is a side elevational view of a walk-behind rotary mower powered by an engine equipped with the brake mechanism of this invention.
Figure 1A:
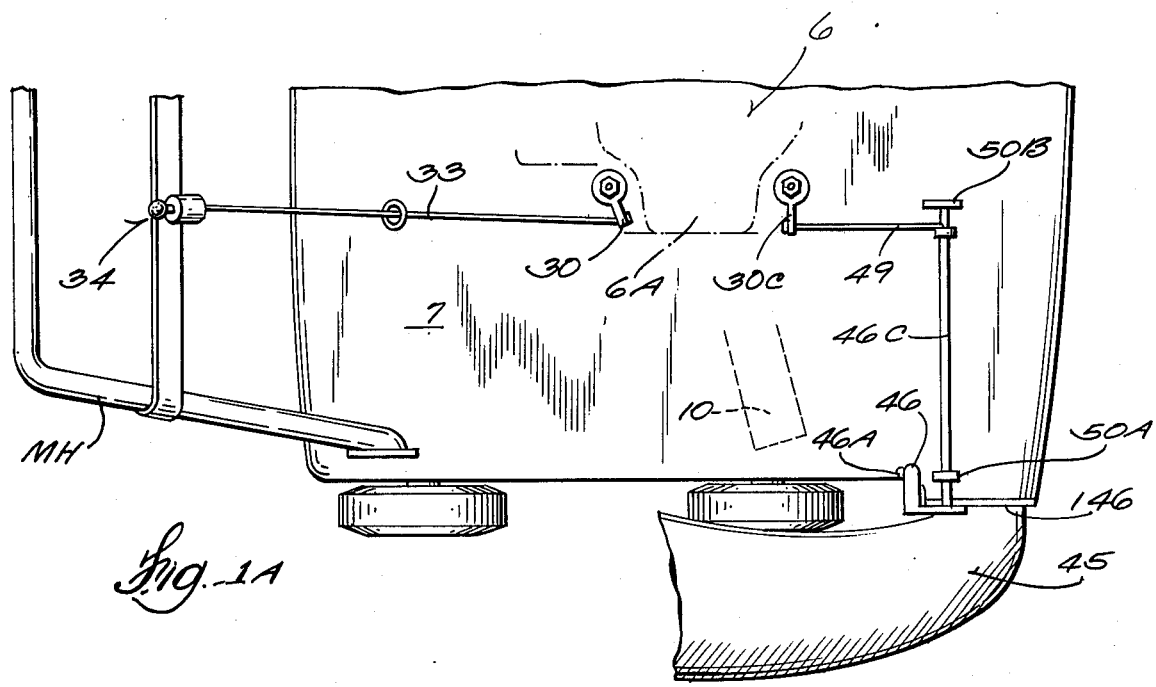
FIG. 1A is an enlarged fragmentary plan view of the rotary mower shown in FIG. 1.

Referring now more particularly to the accompanying drawings, the numeral 6 in FIGS. 1 and 1A generally designates a walk-behind rotary lawn mower powered by a single cylinder internal combustion engine 6A. The engine is mounted on the deck 7 of the mower housing, and preferably is of the vertical shaft type having its crankshaft — which constitutes the drive shaft of the engine — disposed vertically, with its lower end portion 9 projecting downwardly through the deck of the lawn mower, to have the blade 10 of the mower fixed thereto. Although not illustrated, it will be understood that the mower can be equipped with traction wheels drivingly connectable with the engine.

The frictional brake mechanism 11 of this invention (see FIG. 9) is operatively interposed between the underside of the mower deck and the mower blade 10. It consists of a pair of discs 17 and 18 concentrically encircling the lower portion 9 of the engine crankshaft, the former — which is lowermost — being fixed to the crankshaft and the latter being freely rotatable with respect thereto. An annular washer-like brake shoe 19 is interposed between the peripheral portions of the discs and is secured to one of them to provide a frictional torque transmitting connection between the discs in consequence of their being forced towards one another by a spring 22. This spring encircles the crankshaft and reacts between the upper disc 18 and a flange 23 fixed to the crankshaft upwardly of the disc 18. By virtue of this torque transmitting connection, the discs 17 and 18, the engine crankshaft and the mower blade 10 fixed thereto all rotate in unison until rotation of the free upper disc is stopped. When that occurs, the frictional torque transmitting relationship between the discs abruptly stops the engine and, with its, rotation of the blade.

The lower disc 17 is a relatively large diameter flange integral with the upper end of a hub 12 that is keyed to the drive shaft 9. A smaller flange 14 extending across the bottom of the hub has diametrically opposite downwardly directed driving lugs 15 that project into holes in the blade to provide a positive driving connection between the drive shaft and the blade when the latter is clamped to the flange 14 by a bolt 16 threaded into the bottom of the drive shaft.

The upper disc 18 which is freely rotatable with respect to the drive shaft, has a ratchet wheel 21 superimposed upon it and secured against rotation with respect thereto in any suitable manner, as by one or more pins 21A. Since the ratchet wheel overlies the free upper disc 18, the force of the compression spring 22 is applied to the disc through the ratchet wheel.

Figure 2:
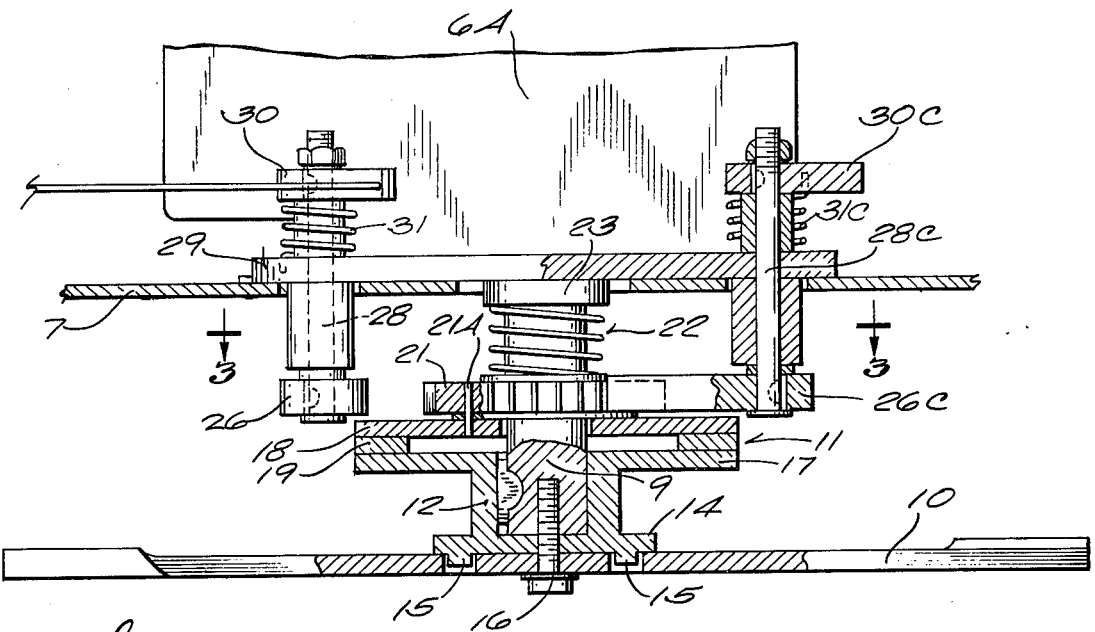
FIG. 2 is an enlarged fragmentary sectional view illustrating the brake mechanism in greater detail.
Figure 2A:
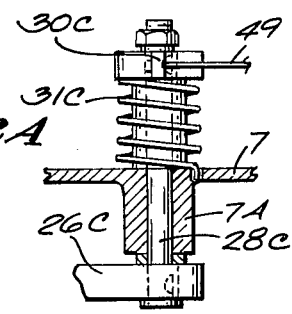
FIG. 2A is an enlarged fragmentary sectional view of a modified embodiment of a part of the brake mechanism.
Figure 3:
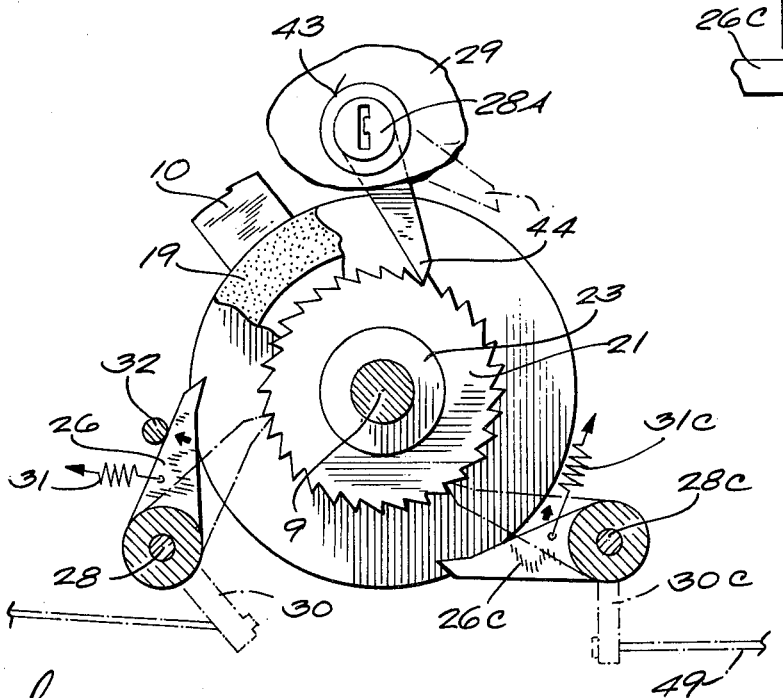
FIG. 3 is a cross sectional view taken on the line 3—3 of FIG. 2.

Inasmuch as the free upper flange 18 and the ratchet wheel are constrained to rotate in unison, it follows that rotation of both can be abruptly stopped by the engagement with the teeth of the ratchet wheel of either of two pawls 26 or 26C in that embodiment of the invention illustrated in FIGS. 1, 1A and 2; and — in that of FIG. 3 — by a pawl 26A. These pawls are respectively keyed to the lower end portion of vertical shafts 28, 28C and 28A, all of which are journalled in bearings fixed with respect to the engine. In FIG. 2, the bearings in which these pawl-carrying shafts are journaled are secured to a mounting plate 29 that may be integral with the engine crankcase, or — as shown in FIG. 2A — these bearings may be provided by bored bosses 7A integral with and projecting down from the mower deck.

The pawl 26 is yieldingly held in a retracted position defined by its engagement with a fixed stop 32 depending from the underside of the deck 7 by a torsion spring 31 reacting between a fixed point on the plate 29 and a lever arm 30 fixed to and projecting from the upper end of the shaft. It remains in its retracted position until the operator exerts a pull on an actuator knob 34 that is operatively connected by a cable 33 with the lever arm, and is slidably mounted on the handle for the mower. Upon the application of a pull on the knob 34, the outer end of the pawl is moved into latching engagement with the ratchet wheel 21. This, of course, stops the ratchet wheel and the upper brake disc to which it is secured, and within less than one second, the frictional torque transmitting connection between the brake discs stops the lower disc 17 and the engine crankshaft.

Although not shown in the drawings, it will be readily apparent that in the event the drive shaft 9 is that of an electric motor, switching mechanism can be actuated by a brake engaging pull on actuator knob 34 to effect de-energization of the motor concurrently with engagement of the brake.

As an alternative to the just-described manner of engaging the pawl with the ratchet wheel, a deadman control 35 may be employed, as shown in FIG. 4. This deadman control comprises a control member 36 which, during operation of the mower, must be continuously held in the rearwardly swung position shown in solid lines in FIG. 4. Unless this is done, operation of the mower is not possible. The control member 36 is connected by a cable 33B with an associated arm 30B that projects radially from the shaft 28B of the pawl 26B to maintain the latter in its retracted inactive position against the force of an actuating spring 31B, see FIGS. 4 and 5. Upon either accidental or deliberate release of the control member 36, the spring 31B pivots the pawl 26B forwardly into engagement with the teeth of ratchet wheel 21 and thus, as described before, brings about abrupt stopping of upper brake disc 18 and frictional braking of lower disc 17.

To preset the deadman control 35 of FIG. 4 for operation of the mower, the control member 36 is pulled rearwardly into close proximity to the main fixedly mounted handle MH of the mower, as shown in solid lines in FIGS. 4 and 4A. Movement of control member 36 to this position acts through the cable 33B and arm 30B in opposition to the spring 31B to swing the pawl 26B to its retracted position defined by stop 32B.

To retain the control member 36 in its solid line pawl-disengaging position and thus enable the engine to be started, a gravity release latch finger 40 is pivotally secured by a pin 41 to the control member 36. With the control member 36 in its rearwardly pivoted position, the latch finger 40 is manually engaged with a retainer pin 42 extending laterall from the main handle MH as shown in FIGS. 4 and 4A. This holds the control member 36 in its retracted position, permitting the engine to be started.

After the engine is started, the operator draws the control member 36 closer towards the main handle, with the result that the latch finger 40 drops away from the retainer pin 42 to its disengaged position shown in dotted lines in FIG. 4. This establishes the desired operating condition requiring that the operator continue to manually retain the control member 36 in close proximity to the main handle in opposition to spring 31B. Hence, upon either accidental or deliberate manual release of the control member 36 from that position, the spring 31B rocks the pawl 26B forwardly to activate the brake mechanism.

In some engine powered mowers, the engine is equipped with an electric starter activated by a key controlled ignition switch. To reduce the hazards incident to operating a mower so equipped, separate manually presettable latch means 43 are provided to prevent accidental starting of the engine. As shown in FIG. 3, this latch means comprises a pawl 44 that is movable from a retracted inactive position (shown in dotted lines) to a position (shown in solid lines) engaging the teeth of the ratchet wheel 21 and thereby preventing rotation of the engine crankshaft. Thus, whenever the pawl 44 is engaged with the ratchet wheel, as shown, the engine cannot be started.

The pawl 44 is secured to the lower end of its vertical shaft 28A, the upper end of which is provided with a key controlled lock which must be unlocked before the shaft can be turned to disengage the pawl from the ratchet wheel. Thus by simply requiring that the lock which secures the shaft 28A against rotation be controlled by a key different from that of the ignition switch, unauthorized or accidental starting of the engine can be prevented.

In addition to the thus far described ways of activating the brake mechanism, removal of the grass bag 45 from the mower also can be used for the purpose. To that end the third pawl 26C is provided. This pawl is keyed to the lower end of a vertical shaft 28C that in all respects is like the shaft 28. Hence it has a radially extending arm 30C fixed to its upper end. In this case, however, the arm 30C and pawl 26C are held in the retracted inactive position in opposition to spring 31C (FIG. 3) by the presence of the grass catching bag 45 in its operative position on the mower.

Referring to FIGS. 4 and 4a, before the bag 45 can be removed, it is necessary to deactivate a latch device 46 which, in its active condition, prevents removal of the bag. This latch device comprises a blocking finger 46' fixed to and projecting radially from one end of a shaft 46C that is journalled in coaxial holes in bosses 50A and 50B rising from the mower deck. The shaft 46C is suitably restrained against endwise displacement from a position in which the blocking finger swings in a plane so located with respect to the grass discharge port of the mower that, upon attachment of the grass bag to the mower, the blocking finger, in its operative position, engages over a flange 146 encircling the mouth of the bag, making it impossible to remove the bag until the blocking finger is lifted out of its operative position.

A spring 46A that reacts between the mower deck and a part fixed with respect to the blocking finger yieldingly holds the blocking finger in its operative position.

At a point remote from the blocking finger, the shaft 48C has a lever 46B fixed thereto and projecting radially therefrom. A motion transmitting link 49 connects the free end of this lever with an arm 30C that projects radially from shaft 28C (FIG. 3) to which the pawl 26C is fixed. Accordingly, engagement of the pawl 26C with the ratchet wheel under the influence of its spring 31C depends upon the position of the blocking finger 46'. As the latter is allowed to be moved by its spring 46A to its operative position preventing detachment of the grass bag, the consequent rotation of the shaft 46C, acting through the link 49, rotates the shaft 28C in the direction to hold the pawl 26C out of engagement with the ratchet wheel. It is, of course, to be understood that despite appearances to the contrary resulting from the diagrammatic showing of the spring 46A (in FIG. 4, this spring is stronger than the spring 31C.

Upon lifting the blocking finger out of its operative position to free the grass bag for detachment from the mower, the consequent rotation of the shaft 46C enables the spring 31C to move the pawl 26C into engagement with the ratchet wheel. It follows, therefore, that removal of the grass bag is accompanied by stopping of the engine, and attachment of the grass bag along with re-engagement of the latch 45, allows the engine to be restarted.

Although perhaps unnecessary, it is noted that the diagrammatic showing of spring 46A in FIGS. 1 and 4, the springs 31 and 31C in FIG. 3 and the spring 31B in FIG. 5, is illustrative of the actual springs, all of which may be torsion springs, as shown in FIGS. 1, 2, 2A and 4.

Those skilled in the art will appreciate that the invention can be embodied in forms other than as herein disclosed for purposes of illustration.

The invention is defined by the following claims:

1. In combination with a rotary power mower having a housing with a support deck, a vertical shaft internal combustion engine mounted on said deck with its shaft projecting therethrough to dispose its lower end portion in the space therebelow, and a cutting blade at the lower end of the shaft;
    A. means securing the cutting blade to the lower end of the shaft in a manner preventing relative rotation between the blade and the shaft;
    B. a pair of axially superimposed brake discs encircling the lower end portion of said shaft, one of discs being fixed to and secured against relative rotation with respect to said shaft so as to rotate with it and the cutting blade and the other being rotationally free of said shaft;
    C. friction means at the contiguous surfaces of said discs;
    D. spring means reacting between said shaft and the disc that is rotationally free of the shaft at all times urging said disc axially toward the disc that is fixed to the shaft with sufficient force to establish and maintain a torque transmitting connection through said friction means between said discs; and
    E. means for abruptly stopping rotation of said free disc to thereby render said torque transmitting connection between said discs effective to quickly stop rotation of the other disc, said shaft and the blade secured to the shaft.

2. The combination of claim 1, wherein said last named means comprises:
    A. a plurality of recesses in said free disc equispaced from the shaft axis; and
    B. a dog mounted for movement along a path fixed with respect to the mower and into any one of said recesses.

3. The combination of claim 1, wherein said last named means comprises:
    A. a ratchet fixed to said free disc; and
    B. a pawl pivotable about an axis fixed with respect to said mower toward and from engagement with the teeth of said ratchet.

4. The combination of claim 1, further characterized by:
    A. a hub secured to said lower end portion of the shaft, and having a rotation imparting connection with the blade; and
    B. a flange integrally formed on said hub providing said fixed brake disc.

5. In combination with a rotary mower having a wheel supported deck, an engine mounted on the deck with its drive shaft projecting through the deck into the space therebeneath, a cutting blade carried by the drive shaft, and means securing the cutting blade against rotation relative to the drive shaft, a selectively engageable brake mechanism operative to stop rotation of said engine drive shaft and the cutting blade and comprising:
    A. a first member encircling and fixed to said shaft to rotate therewith;
    B. a second member freely rotatably encircling said shaft and adjacent to said first member;
    C. expansible means urging said second member axially into frictional driving engagement with said first member; and
    D. manually movable stop means engageable with said second member to abruptly and positively stop rotation thereof and thus effect frictional stopping of said drive shaft and cutting blade.

6. In combination with a rotary mower having a wheel supported housing with a support deck thereon and a guide handle for manually guiding movement of said mower during mowing:
    A. a prime mover on the deck of the mower housing having a drive shaft disposed beneath the deck with a blade and first disc affixed thereto;
    B. a rotary brake disc freely encircling said power driven shaft and having circumferentially spaced tooth means thereon;
    C. pressure means urging said discs into frictional driving engagement;
    D. a plurality of pawls respectively pivotable about spaced apart parallel axes fixed with respect to said housing and spaced radially from said circumferentially spaced tooth means for movement to and from an operative position in engagement with said tooth means; and E. a plurality of actuating members each operable to pivot a selected pawl into engagement with said tooth means and comprising:
1. a lock controlled member for selectively moving one of said pawls from its operative position to a position disengaged from said tooth means to enable starting and operation of said prime mover,
2. emergency control means including resilient means yieldingly biasing another of said pawls to a retracted position and operable to effect movement of said pawl into engaged position in opposition to said associated resilient means,
3. a function control member movable on said housing into a function performing position and operatively connected with a different one of said pawls to effect movement thereof into latched engagement with said tooth means in consequence of performance of said function, and
4. a safety control member adjacent to said guide handle and movable to a predetermined position relative thereto, said safety control member being operatively connected with one of said pawls that is biased toward engagement with said tooth means to effect retraction thereof from its operative position, said safety control member having a gravity release detent movable into releasable latched engagement with a part on said guide handle for retaining said safety control member in disengaged position, said safety control member being further movable from its detent held position to establish a dynamic operating condition requiring continuous manual retention of said safety control member in said predetermined position in opposition to the biasing force acting on the pawl for manually maintaining said pawl disengaged from the tooth means.

7. In combination with a rotary mower having a protective housing including horizontal support means and a power driven vertical shaft having a portion which projects downwardly through said support means to have a blade secured thereto for rotation therewith, a selectively engageable brake mechanism operative to stop rotation of said power driven shaft and blade, and comprising:
A. a first disc concentrically secured to said power driven shaft;
B. a brake disc freely encircling said power driven shaft, said brake disc having ratchet teeth thereon;
C. expansible means urging said brake disc axially into continual frictional engagement with said first disc;
D. pawl means carried by said housing for pivotal movement toward and from engagement with the ratchet teeth on said brake disc; and
E. actuating means carried by said housing and connected with said pawl means, for effecting pivotal movement thereof into engagement with one of said ratchet teeth to thus quickly stop rotation of the brake disc and thereby activate said brake mechanism.

8. In combination with a walk behind rotary power mower having a vertical shaft engine mounted on the deck of its housing and having a cutting blade secured to the end of the engine power shaft beneath the deck:
A. a brake comprising a pair of flatwise juxtaposed frictionally connected discs which encircle the shaft at a location between the deck and the cutting blade, only one of said discs being constrained to rotate with the shaft;
B. spring means at all times maintaining the frictional connection between the discs so that the brake is effective to stop the shaft from rotating any time the other of said discs is restrained against rotation;
C. cooperating disc rotation restraining means comprising
1. a plurality of spaced apart recesses in said other disc at locations equidistant from the shaft axis, and
2. a dog carried by the mower for movement to and from an operative position engaged in one of said recesses; and
D. means for manually effecting movement of the dog to its said operative position.

9. The combination of claim 8, further characterized by:
A. a grass catcher bag on the mower to receive grass clippings issuing from a discharge opening in one side of the mower housing;
B. a latch device mounted on the mower housing and comprising a blocking member which must be moved from one position to another to permit removal of the bag from the mower;
C. a second dog carried by the mower, for movement to and from an operative position engaged in one of said recesses to thereby restrain said other disc against rotation; and
D. means connecting said second dog with said latch device and operable upon movement of its blocking member to its said other position to effect movement of said second dog to its operative position arresting rotation of said other disc.

10. the combination of claim 9, further characterized by:
A. spring means acting upon said second dog to yieldingly urge the same toward its operative position;
B. said latch device further including manually actuatable trigger means by which the blocking member of the latch device is movable to its said other position; and
C. said second dog being held in an inoperative position against the spring force acting thereon, by a spring force exerted on said trigger means, except upon actuation of the trigger means to move the blocking member to its said other position.

11. The combination of claim 8, further characterized by:
A. a handle assembly mounted on the mower housing and extending upwardly and rearwardly therefrom;
B. and said means for manually effecting movement of said first dog to its operative position comprising a manually actuatable control member mounted on the handle assembly at a location near its upper end; and
C. means operatively connecting the control member with said first dog.

12. The combination of claim 11, further characterized by:
A. spring means acting on said first dog to yieldingly urge the same to its operative positive;
B. said connecting means comprising a flexible cable; and
C. cooperating stop means on the handle assembly and the control member yieldingly held in engagement with one another under the force of said spring means, to thereby define the inoperative position of said first dog.

13. The combination of a walk-behind rotary power mower having as its power source a prime mover with a rotatable drive shaft, and a cutting blade fixed with respect to the drive shaft of the prime mover to at all time rotate directly therewith, a brake to abruptly and simultaneously stop the prime mover and the cutting blade, said brake comprising:
   A. a pair of spring loaded friction discs one of which is fixed to the drive shaft and the other of which is freely rotatable thereon;
   B. a ratchet wheel coaxial with respect to said freely rotatable friction disc and fixed against rotation relative thereto;
   C. a pawl pivotable about an axis fixed with respect to the prime mover for movement to and from engagement with the ratchet wheel to thereby abruptly restrain said freely rotatable friction disc against prime mover produced rotation and accordingly apply a braking action to said other disc and the drive shaft to which it is fixed; and
   D. means for effecting engagement between said pawl and ratchet wheel.

14. The combination defined by claim 13, wherein said means for effecting engagement between the pawl and the ratchet wheel is activated by the performance of a function in the operation of the mower, such as removal of the grass clipping bag.

15. In combination with a rotary lawn mower and a prime mover mounted thereon, said prime mover having a blade driving shaft, brake means to react between said shaft and a part fixed with respect to the lawn mower and the prime mover to hold the shaft against rotation, said brake means comprising:
   A. a pair of brake discs concentrically encircling said blade driving shaft, one of said discs being constrained to rotate with said shaft and the other disc being rotatable with respect thereto, and having at least two radially disposed abutments thereon;
   B. means providing and maintaining a constantly effective frictional torque transmitting connection between said discs;
   C. a locking member mounted for movement along a path fixed with respect to the lawn mower and the prime mover to and from an operative position engaged with one of said abutments to positively hold said other disc against rotation and thereby frictionally prevent rotation of said shaft;
   D. manual control means operable to move said locking member to and from engagement with said abutment;
   E. a second locking member mounted for movement along a path fixed with respect to the lawn mower and the prime mover to and from an operative position engaged with one of said abutments;
   F. resilient means urging said second locking member out of its operative position; and
   G. control means operative to move said second locking member to its operative position for stopping rotation of said shaft.

* * * * *